Sept. 6, 1949. C. O. PALMER 2,481,338
FISHING ROD HOLDER AND REEL LOCK
Filed March 7, 1947
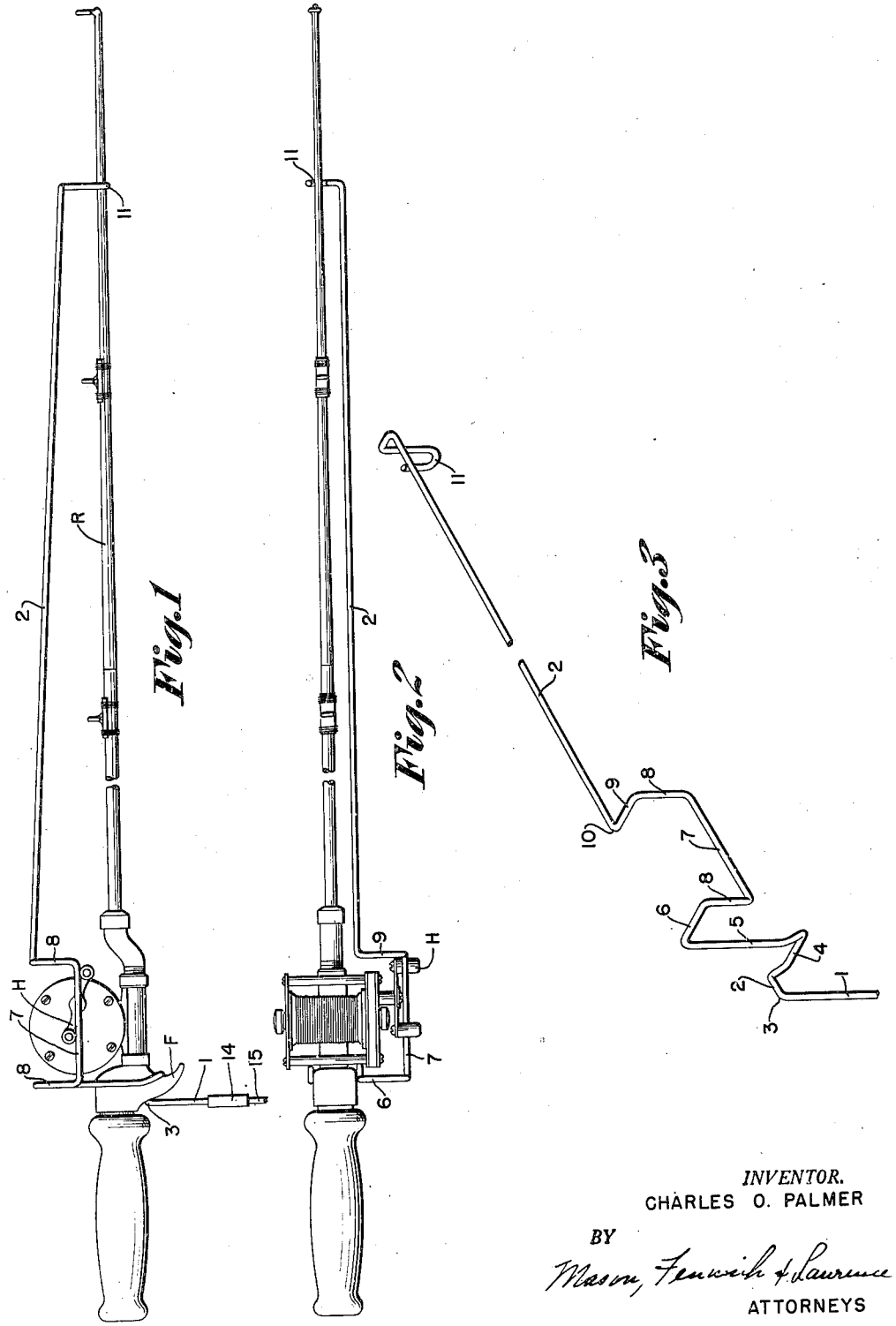
INVENTOR.
CHARLES O. PALMER
BY
Mason, Fenwick & Lawrence
ATTORNEYS Patented Sept. 6, 1949

2,481,338

UNITED STATES PATENT OFFICE 2,481,338

FISHING ROD HOLDER AND REEL LOCK

Charles O. Palmer, Bergholz, Ohio

Application March 7, 1947, Serial No. 733,129

4 Claims. (Cl. 43—4)

1

This invention relates to a fishing rod support by means of which a fisherman can utilize if he wishes a plurality of rods either from the shore or from a boat, and be required to give attention to the fishing of any particular rod only when there has been a bite and it is necessary to reel in.

An object of the invention is to provide an improved and simplified fishing rod support which will securely hold the fishing rod when in its normal operative position, but which will permit the quick and easy removal of the rod after a fish has taken the hook.

A further object of the invention is to provide an improved fishing rod support so constructed that when the rod is equipped with a reel and is in operative position on the support, the reel will be effectively locked to prevent the further paying-out of the line.

Further objects will more particularly appear in the course of the following detailed description.

One sheet of drawings accompanies this specification as part thereof, in which like reference characters indicate like parts throughout.

In the drawings:

Figure 1 is a side elevation of the improved device with a fishing rod in operative position thereon;

Figure 2 is a plan view of the device shown in Figure 1, and

Figure 3 is a perspective view of the device with the fishing rod removed.

In the embodiment of the invention herein illustrated, the improved fishing rod support is shown formed from a rod of metal or other suitable rigid material, which rod is bent as at the point 3 to form what may generally be described as the two legs 1 and 2, disposed at an angle herein illustrated as substantially a right angle with respect to each other.

The leg part 2 is further bent upon itself closely adjacent the bend 3 to form an open top cradle loop 4 adapted to receive the finger-piece F of a hand grip type fishing rod handle, as illustrated in Figures 1 and 2, this cradle loop 4 being disposed substantially perpendicular to the leg 1.

One leg portion 5 on loop 4 is extended beyond the other leg portion and bent into an outwardly directed reach 6 which is in turn bent to form a depending loop 7 having substantially parallel leg portions 8—8, the loop 7 being disposed substantially at a right angle to the cradle loop 4. This loop 7 is open at its top and functions as a locking loop adapted to engage the handle grips H of a conventional fishing reel mounted upon the handle of the fishing rod R.

2

The outer leg portion 8 of the locking loop 7 is bent backwardly to form a reach 9 parallel with the part 6, and again bent as at 10 so that the major portion of the leg 2 extends beyond this locking loop 7 and has its free end formed with an offset open top cradle loop 11, which loop 11 is substantially parallel with the cradle loop 4.

The other or supporting leg 1 is conveniently associated as by a conventional slip ferrule connection 14 with an extension leg 15 which may be pointed or squared as preferred on its free end to permit either sticking this rod into the bank of a stream, or supporting same from a suitable bracket attached to a boat, as may be desired.

The operation of the device will be apparent from the drawing, but it will be particularly noted that when the fishing rod R is in normal operative position and supported by the device, the rod itself is locked in this position by the engagement of the reel handles H with the locking loop 7 so that any tension on the fishing rod cannot possibly tilt the rod in the support, but on the other hand the rod can be readily disengaged and removed from the support by a slight turn or twist of the rod on its own longitudinal axis, which thereby disengages the reel handles H and permits the instantaneous removal of the rod for the purpose of playing and bringing in the fish. This rotation of the rod on its long axis is possible because this axis is substantially below the locking loop 7 so that, while rotation of the rod in a clockwise direction is impossible because of engagement of the handle lever H with loop 7, rotation of the rod in a counterclockwise direction moves the reel bodily away from loop 7, the short handles sliding axially over same. It will furthermore be observed that when the rod is in operative position, and thus securely engaged with the support, the reel by the engagement of its handles H with the locking loop 7 is secured against rotation so that there can be no paying-out of the line until the rod is deliberately turned on its longitudinal axis to release the reel handles.

The exact shape, size and positioning of the loops will necessarily be determined by the proportions and arrangement of the particular fishing rod with which the device is to be used, and other changes may readily suggest themselves to those skilled in the art but within the scope of the present invention as claimed.

Having thus fully described the invention, I claim:

1. A fishing rod support comprising a rod provided with a bend at a point intermediate its ends to provide angularly disposed legs, one of said legs being formed adjacent said bend with a cradle loop for the handle of the rod and a reel-engaging loop arranged to lock the handle of a reel, and the end of the latter leg being provided with a loop in which the rod adjacent its tip can rest.

2. A fishing rod support comprising a rod provided with a bend intermediate its ends to provide two angularly disposed legs, one of said legs being formed adjacent said bend with an open cradle loop, and an open locking loop at right angles to the first loop, said last mentioned leg being formed adjacent its free end into another open cradle loop in a plane at right angles to the leg, the first and last mentioned cradle loops being substantially parallel and the intermediate locking loop being in a plane at right angles to the planes of said cradle loops and offset with respect to said cradle loops and the other leg.

3. A fishing rod support comprising a rod formed with a bend intermediate its ends to form two legs disposed at substantially a right angle, one of said legs being formed adjacent said bend to provide an open-top cradle loop, and an adjacent offset open-top locking loop, said last mentioned leg being bent adjacent its free end to provide a second open-top cradle loop substantially parallel with the first cradle loop, and the intermediate locking loop being in a plane substantially at a right angle with respect to planes passing through the cradle loops and set off to one side of the centers of both of said cradle loops.

4. A fishing rod support comprising a rod formed with a bend to form angularly disposed legs, one of said legs further being formed by bends to provide aligned, longitudinally spaced, open-top cradle loops to hold a fishing rod supported thereon, and an intermediate loop arranged to engage the handle of a reel mounted on the fishing rod, to simultaneously lock the reel against rotation and the fishing rod in its cradled position.

CHARLES O. PALMER.

REFERENCES CITED

The following references are of record in the file of this patent:

UNITED STATES PATENTS

| Number | Name | Date |
|---|---|---|
| D. 143,952 | Curtis | Feb. 26, 1946 |
| 479,219 | Lane | July 19, 1892 |
| 525,132 | Burke | Aug. 28, 1894 |
| 981,631 | Fraser | Jan. 17, 1911 |
| 1,025,657 | Towne | May 7, 1912 |
| 1,256,191 | Wittkowski | Feb. 12, 1918 |
| 1,876,478 | Van Duzer | Sept. 6, 1932 |
| 2,293,305 | Oldham | Aug. 18, 1942 |